United States Patent [19]

Schuster

[11] Patent Number: 5,079,458

[45] Date of Patent: Jan. 7, 1992

[54] MAGNETIC HELIX NON-CONTACTING LINEAR DRIVE

[76] Inventor: Peter Schuster, Prinzregentenstr. 41, D-8201 Raubling, Fed. Rep. of Germany

[21] Appl. No.: 348,002

[22] PCT Filed: Jul. 8, 1988

[86] PCT No.: PCT/EP88/00616

§ 371 Date: Jun. 20, 1989

§ 102(e) Date: Jun. 20, 1989

[87] PCT Pub. No.: WO89/02184

PCT Pub. Date: Mar. 9, 1989

[51] Int. Cl.$^5$ .................. H02K 41/00; H02K 7/09
[52] U.S. Cl. ........................ 310/12; 310/83; 310/90.5
[58] Field of Search ............ 310/12, 46, 80, 90.5; 33/1 M, DIG. 1; 384/42, 913

[56] References Cited

U.S. PATENT DOCUMENTS

| 4,037,886 | 7/1977 | Boden et al. | 310/90.5 |
| 4,065,188 | 12/1977 | Ridler et al. | 310/90.5 |
| 4,234,831 | 11/1980 | Kemmer et al. | 310/12 |
| 4,712,027 | 12/1987 | Karidis | 310/12 |

FOREIGN PATENT DOCUMENTS

| 2513424 | 10/1975 | Fed. Rep. of Germany | 310/90.5 |
| 2206620 | 6/1974 | France . | |
| 2259472 | 8/1975 | France . | |
| 55-10839 | 1/1980 | Japan | 310/83 |
| 187649 | 11/1983 | Japan | 310/83 |
| 60-96170 | 5/1985 | Japan | 310/12 |
| 63-52649 | 3/1988 | Japan | 310/12 |
| 476641 | 11/1975 | U.S.S.R. | 310/12 |

OTHER PUBLICATIONS

Krasnikou, "Mechanisms and Transmissions with Magnetic Links", Russian Engineering Jour., vol. 53, No. 4, 1973, pp. 27-29.

Primary Examiner—Steven L. Stephan
Assistant Examiner—D. L. Rebsch
Attorney, Agent, or Firm—Toren, McGeady & Associates

[57] ABSTRACT

A non-contacting linear drive includes a fixed guidance part constructed as a profile part whose magnetic material in the vicinity of helixes (3,4) approaches (8,11,17) the latter and, at a distance from the helixes, forms a return path to the next helix. The rotary part has spaced double helixes, (3,4), a constant magnetic field (7) being produced in the magnetic circuit formed by a double helix and the magnetic return path. A very simple and economic construction and manufacture are consequently possible. The guidance part (2) can be constructed as a profile rail (9) or as a tube (10,15) and has window-like recesses (6), corrugations (11,12) or ribs (17). The double helix (1) can be constructed with permanent magnets (14) placed in the helixes with radial orientation or with permanent magnets (14) provided between soft magnetic helixes in axial orientation.

15 Claims, 3 Drawing Sheets

MAGNETIC HELIX NON-CONTACTING LINEAR DRIVE

The present invention relates to a non-contacting or contact-free linear drive according to the preamble of claim 1 and such as is e.g. used for driving magnetic suspended railways and elevators.

Such a linear drive is known from DE-OS 31 20 28 and at present several non-contacting linear drive systems are known.

For example, a so-called linear motor is known, in which the stator is provided along the guideway or track, while the rotor is located on the vehicle. Another known system has permanent magnets along the guideway or track, while the vehicle carries an electromagnet, which continuously changes its polarity, so that it is drawn along the permanent magnets.

All these known drive systems suffer from the disadvantage that they consume a large amount of electric current, particularly because there is a relatively large air gap between stator and rotor. However, the power consumption increases with the square of the distance and in addition a relatively large amount of energy is lost through heat generation.

DE-OS 31 20 328 discloses a linear motor whose primary part is a rotary cylindrical roller, on whose circumference are helically provided magnets. The north and south poles are constructed as continuous bands or strips and as a result in the vicinity of the cylinder surface is formed an axially travelling field. Due to the close succession of the magnetic pole strips, said field in part briefly closes between the poles and only a relatively small part closes over the secondary part, in which is also produced a relatively high eddy current proportion. Therefore this known motor is not very economic.

In addition, German Patent 34 28 684 discloses a magnetic gear whose primary part is constructed as a magnet wheel, which cooperates with a secondary part slotted in tooth-like manner. This magnetic construction also has relatively low efficiency because the magnetic circuit is only closed over the secondary part by two successive poles on the wheel circumference.

SUMMARY OF THE INVENTION

The problem of the present invention is to provide a non-contacting linear drive which has a very economic construction and operation. This problem is solved by a non-contacting linear drive which includes at least one linearly oriented, tubular fixed guidance part of ferromagnetic material. Ferromagnetic double helixes are provided on the inner wall surface of the guidance part. The guidance part is a profile part. At least one rotatable transportation part including a permanent magnet is movable along the guidance part and is arranged coaxially therewith. Each helix of the guidance part corresponds to a pole of the magnet of the at least one transportation part. The rotatable transportation part also has double helixes of ferromagnetic material which are arranged around a core. A magnetic circuit is formed by the guidance part and the transportation part for producing a constant magnetic field. The permanent magnets in the transportation part are mounted in such a way that the two helixes of the transportation part are oppositely polarized.

The construction of the operationally essential parts as a profile part and a double helix is relatively simple and leads to an inexpensive construction.

According to a further development of the inventive concept, either the double helix can be the fixed guidance part and the rail the movable transportation part or vice versa. When the invention is used for vehicles, e.g. magnetic suspended railways, it is appropriate to use the profile rail as the fixed guidance part and the double helix as the movable transportation part. The rail can simultaneously form part of the suspended railway, while the double helix is fixed to the vehicle.

According to a further development of the inventive concept the profile part can be differently constructed. It is important that in the same axial distance sequence as for the helixes, the profile part always does or does not have material in the vicinity of the helix (rhythm: material yes-no-helix-yes-no-helix, etc.).

Thus, the profile part can be a profile rail extending substantially tangentially to the worm. However, the rail can also be curved about the same axis as the worm and then substantially concentrically surrounds or encases at least in part the screw. This leads to a greater effective area and therefore to a higher efficiency.

Finally, the profile part can surround the screw as a concentric tube and only a continuous, axial gap remains open through which project the mounting or fixing elements for the screw.

Either when constructed as a rail, or when constructed as a tube, the profile part can realize the material approach in different ways. Thus, the profile part can have window-like recesses, which are located over the helixes and the magnetic flux takes place over the intermediate webs.

The profile part can also have a substantially wavy or undulatory profiling with succeeding wave hills and valleys in the transportation direction. It is advantageous if the tips of the wave hills close to the helixes are substantially parallel to the circumferential surface and are substantially removed at the same axial extension of the helixes, so that the magnetic flux is optimized.

Finally, the profile part can have ribs directed substantially at right angles to the double helix, so that the base of a rib faces a helix with only a limited spacing or gap.

The ribs can be applied or welded to a smooth support part. The profile part can also comprise individual L-profile elements and in each case the axially directed legs can e.g. be welded together as bodies and the legs at right angles thereto are directed substantially radially with respect to the worm. Finally, the profile part can be formed from individual U-profile elements, whose legs are superimposed in axial sequence, or from T-profile arranged with the central leg pointing radially inwards. This welded construction or production of the ribbed profile part is particularly advantageous and economic in the case of a tubular construction of the profile part.

Obviously the wavy profile part can also be welded together from individual elements or components, or the profile tubes can in each case be constructed as welded endless tubes from L or U-profile strip material.

According to another further development of the inventive concept the magnetic field acting between the two parts is produced by means of permanent magnets. The permanent magnets can be arranged either in the double helix or in the rail.

When the permanent magnets are arranged in the double helix, in a first embodiment the construction is such that the two helixes are arranged around a soft magnetic core and the helixes are oppositely polarized. For this purpose, the magnets in the helixes with radial orientation are provided in such a way that in one helix the south poles and in the other helix the north poles are always directed outwards. Thus, it is possible to refer to a south pole helix and a north pole helix. The magnetic flux resulting from this arrangement is as follows when constructing the profile part as a soft magnetic profile rail with recesses. It comes out of the north pole, clears the air gap between the worm and the iron rail, then passes into a spoke of the profile rail and comes out again before the next recess. It then clears the next air gap and enters the south pole of the next helix. The inner poles of the helixes close through the soft magnetic core and consequently the complete circuit is closed. The helixes have a predetermined spacing from the iron rail. According to the invention, they can be rotated by an electric motor and according to a preferred embodiment are mounted on the vehicle. The rotation of the helixes leads to a constant magnetic field, which moves the vehicle. Since, in this embodiment, the profile rail is fixed to the track or in the case of magnetic suspended railways is fixed to the support profile, the helixes in each case forming a worm are screwed thereto and along the same and consequently produce the necessary drive for the vehicle on which the worms are fixed.

According to a second worm construction, the helixes can be made from a soft magnetic material, whilst the core is of a non-magnetic material. The permanent magnets are arranged in the gap between the helixes with a substantially axial orientation. The magnets of one gap are introduced with e.g. the north pole pointing in the transportation direction, while the other gap is equipped with south-oriented magnets, so that in each case a helix is flanked by identical poles, i.e. in each case a south helix of south poles. Thus, in the helixes, there is a high concentration of magnetic lines, so that the efficiency can be greatly increased.

According to a further development of the inventive concept the entire double helix can be made from a soft magnetic material, while the permanent magnets in the profile rail are provided with the same spacing as the helixes of the double helix. The rotating double helixes over which closes the magnetic flux of the permanent magnets successively arranged in the transportation direction, lead to a drawing of the double helix worms along the magnet-equipped profile rails.

The inventive drive can be constructed in different ways, in that different numbers of double helixes and profile rails are associated with one another.

Thus, a single double helix can cooperate with a single profile rail. However, this is not the optimum case because the force ratio is relatively one-sided, i.e. there is no force balance. Additional precautions must be taken, so that the spacing between the profile rail and the helix is always maintained in an optimum manner.

There can also be two oppositely synchronously rotating double helixes and only one rail arranged between them. This constitutes a very advantageous embodiment, which has a multiplicity of uses.

A very good and precise operation is also provided by the construction with a double helix provided between two parallel profile rails diagonally facing with respect to the double helix.

The transportation movement brought about by the linear drive can continuously take place in one direction, if e.g. the double helixes are continuously rotated in one direction. However, a reciprocating movement can also be produced of the type particularly used in machine tool construction, if the helixes or the worm performs pivoting movements in the clockwise or counterclockwise direction.

The worms formed from the helixes and the core can, e.g. be made to rotate by means of an electric motor in per se known manner. However, it is also possible to transfer a rotary movement via known transmission elements to the worm from other rotating components, e.g. of the vehicle or machine tool.

In the arrangement with two worms and one profile rail, the worms are so reciprocally arranged that in the case of their synchronous rotary movement the helixes with the same poles always face one another in mirror symmetrical manner. As a result of the repulsion caused, a greater force is produced.

It is finally advantageous to provide on the double helix transportation part a safety helix made from non-magnetic steel. This is a passive helix, which need have no more than one or a maximum of two turns. The safety helix projects radially and relatively deep into the profile part and cooperates with its radial ribs in the manner of a friction brake. Thus, in the case of overloading of the rotor, the latter cannot slide through, because the safety helixes are mounted on the ribs of the profile part and brake the sliding-through movement. The distance between the profile ribs and the safety helix must be such that, by means of the safety helix, the rotor is engaged on the profile ribs shortly before the magnetic field is interrupted or broken. This is the case with an approximately 90% loading.

It is advantageous in the construction with double helixes and radially oriented magnets and at the same time space-saving to provide the safety helixes between the magnetic helixes on the core. In the case of axially oriented magnets this is not possible. It is then appropriate to provide the safety helixes on a core portion outside the pole helixes. Greater strength is obtained if in this area the core diameter is matched to the larger diameter of the pole helixes, so that the safety helix essentially only has the height of the profile ribs.

The inventive drive has major advantages compared with the conventional linear motor. The worms can be driven by a normal electric motor operating in the ideal case, i.e. when the rotor and stator have the smallest possible gap. The power consumption is always constant and is not dependent on the size of an air gap.

The optimum and very economic usability of the inventive linear motor is also very advantageous because the motor can be used for transportation movements in substantially any random direction. Thus, it can be used in optimum manner for horizontal transportation such as, e.g. for suspended railways, gates, machine tools or other machines where relative movements have to be carried out of or within the complete machines.

It is also very advantageous to use the inventive motor for vertical transportation, because compared with lifts or elevators for people or goods operating in conventional manner with transportation cables, there is no need for additional structures above and below ground for drives. Thus, there are no heavy cables or ropes e.g. for underground working it being possible to traverse galleries of great depth, whereas at present it is necessary to travel along several reciprocally displaced sections involving in each case a new, complete transportation system with all the resulting costs.

BRIEF DESCRIPTION OF THE DRAWINGS

The invention is described in greater detail hereinafter relative to non-limitative embodiments and the attached drawings: The drawings show in FIG. 1 an inventive linear drive in a first embodiment with two double helixes and a profile rail as the profile part in plan view.

DETAILED DESCRIPTION OF THE PREFERRED EMBODIMENTS

Figure 1:
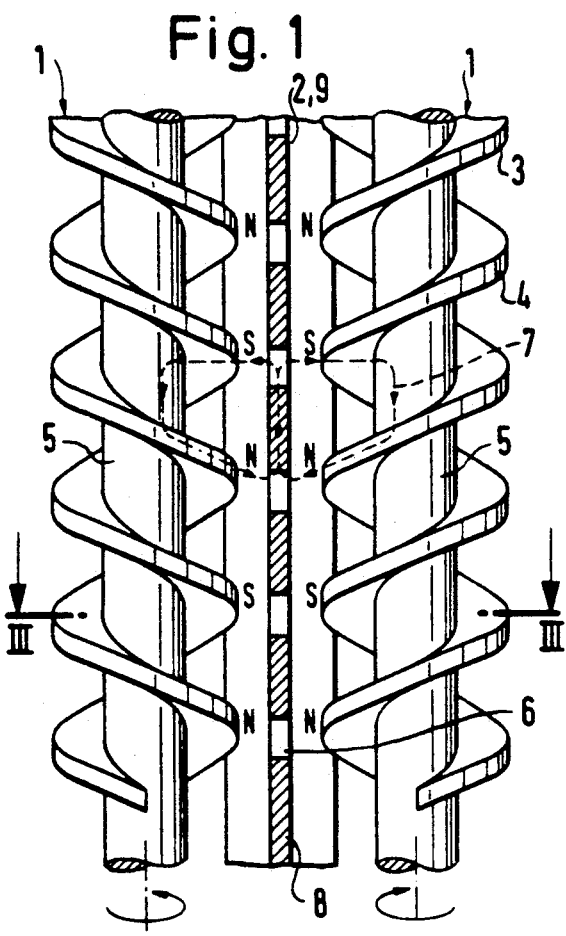

According to FIG. 1, a non-contacting linear drive according to a first embodiment comprises a profile part 2 constructed as a soft magnetic profile rail 9 with respect to each of whose flat sides is equidistantly arranged, with an air gap, in each case one double helix 1 with the same height, i.e. in a substantially homologous manner. The double helix 1 forming a worm essentially comprises a soft magnetic core 5 around which are equidistantly arranged two helixes 3,4 made from permanent magnetic material or constituted by permanent magnetic pieces. The polarity is such that it is oppositely directed from one helix to the next, so that a north helix 3 and a south helix 4 are formed. Thus, along the profile iron rail 9, considered in the longitudinal direction, a north pole and a south pole constantly alternate.

In a first embodiment, helixes 3 and 4 can be completely made from a soft magnetic material, but the possibility also exists of embedding small bar magnets in radial alignment in non-magnetic material in such a way that a double helix with a soft magnetic core is formed. This embedding can be brought about by using various known processes, such as by casting or sintering in.

The two helixes 1 in each case forming a worm are so arranged with respect to one another and to the profile rail 9 that they are precisely mirror symmetrical to the rail, so that in each case a north helix of one worm faces a north helix of the other worm at precisely the same height.

The iron rail has window-like recesses 6, which are longitudinally arranged with the same reciprocal spacing as the helixes. The magnetic flux formed by magnetic lines 7 is as follows. It comes out of the north pole, clears the air gap between the north helix 3 and the profile rail 9 and then enters a spoke of rail 1. It then passes through spoke 8, so as to again clear the air gap between profile rail 9 and helix 4 at the height of the latter and enters said south helix 4. The inner poles of the helixes close through the soft magnetic core 5.

Figure 2:
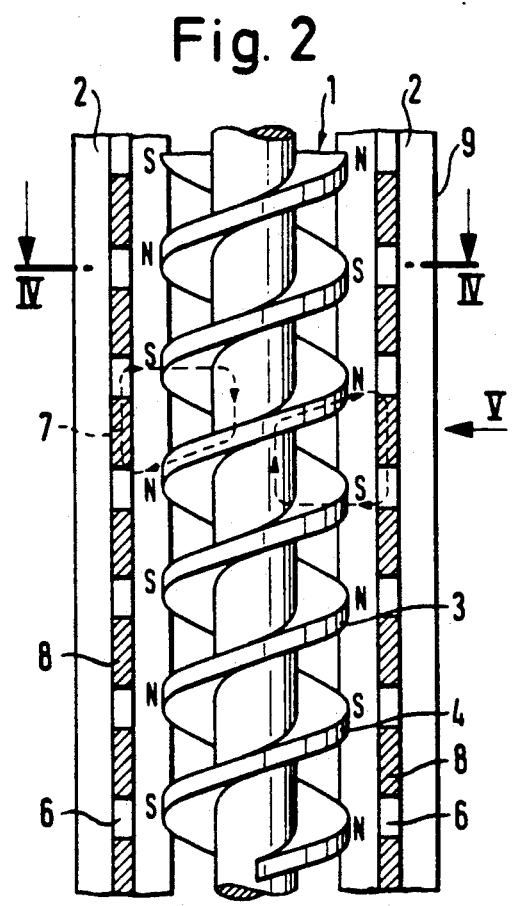
FIG. 2 a drive according to FIG. 1 in a second construction with a double helix and two profile rails in plan view.

In the embodiment shown in FIG. 2 the non-contacting linear drive comprises a double helix 1, on whose two diametrically opposite sides are arranged substantially homologously two profile rails 9. The profile rails also have recesses 6, which are substantially equidistant, so that in each case a north helix faces a recess of the first profile rail and simultaneously a south helix 4 faces a recess of the second rail 2.

Figure 3:
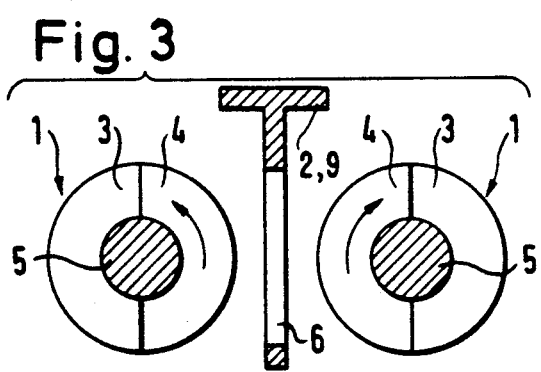
FIG. 3 a section along lines III—III of FIG. 1.

FIG. 3 shows the symmetrical arrangement of two double helixes with respect to a central rail (FIG. 1). It can be seen that the width extension of profile 9 is substantially tangential to the outer circumference of in each case both double helixes and that the recess 6 is precisely located between the helixes, namely between homopolar helixes, in this case the north helixes 3. As a result of the rotary movement, the helix circumference closest to the rail runs in the longitudinal direction of the latter, e.g. upwards in FIG. 1. Thus, it is accompanied by the magnetic field which also runs through the rail. It has the tendency to make the rail also run. In the case of a fixed arrangement of the double helixes and the movable arrangement of the rail, the latter will also perform this translatory movement. In the case of a fixed arrangement of the iron rail and the fixing of the double helixes to a vehicle the helixes will also draw along the rail in such a way that the optimum magnetic field 7 is maintained through the spokes 8 of the profile rail. In the same way, in the embodiment shown in FIG. 2, it is possible to produce the movement of the parts. Once again the magnetic field 7 closes in the same way as in FIG. 1, but on either side of the double helix and substantially diagonally opposite to the two helixes leading to the same movement type as in the embodiment according to FIG. 1. Either the iron rail is moved, or the helixes move along the profile rails corresponding to the rotation direction.

Figure 4:
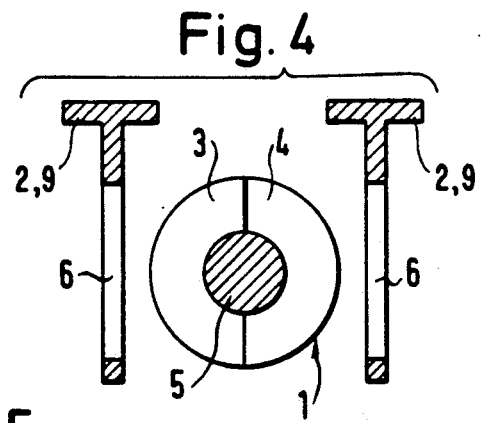
FIG. 4 a section along lines IV—IV of FIG. 2.

FIG. 4 shows the symmetrical arrangement (as in FIG. 2) of the two profile rails 9 with respect to the double helix.

Figure 5:
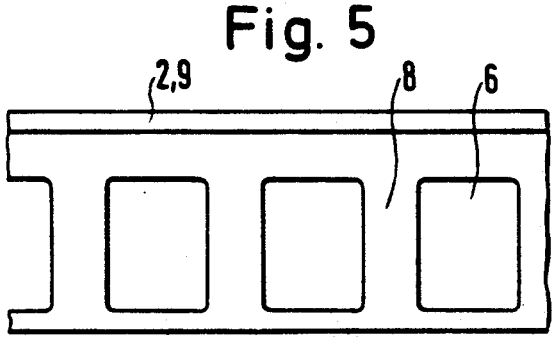
FIG. 5 a view along arrow V of FIG. 2 of a profile rail.

FIG. 5 is a view of a profile rail 9, it being possible to see the recesses 6 with the interposed spokes 8.

Figure 6:
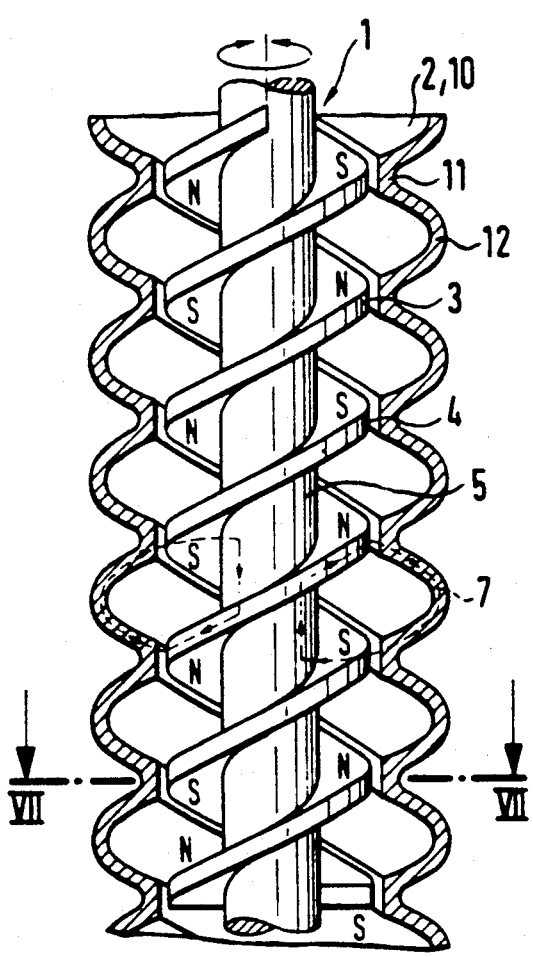
FIG. 6 a third construction of a linear drive with a double helix and an undulatory tube as the profile part.
Figure 7:
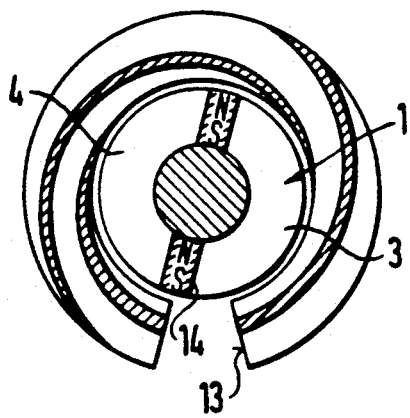
FIG. 7 a section VII—VII of FIG. 6 showing the arrangement of the magnets in the helixes.

The embodiment of FIGS. 6 and 7 comprises a double helix 1, in which permanent magnets with a radial orientation are arranged in helixes 3,4. Core 5 is made from soft magnetic material. Around the double helix is provided a substantially concentrically arranged, corrugated tube, which in axial sequence has hills 11 and valleys 12. The corrugations or waves are made with the same pitch and slope as the helixes 3,4 of double helix 1. The double helixes and corrugated tube are so associated with one another that in each case a helix faces a hill having a flattened tip.

As can in particular be gathered from FIG. 7, tube 10 has a slot-like, axial opening 13, through which pass not shown mounting or fixing elements for double helix 1.

Figure 8:
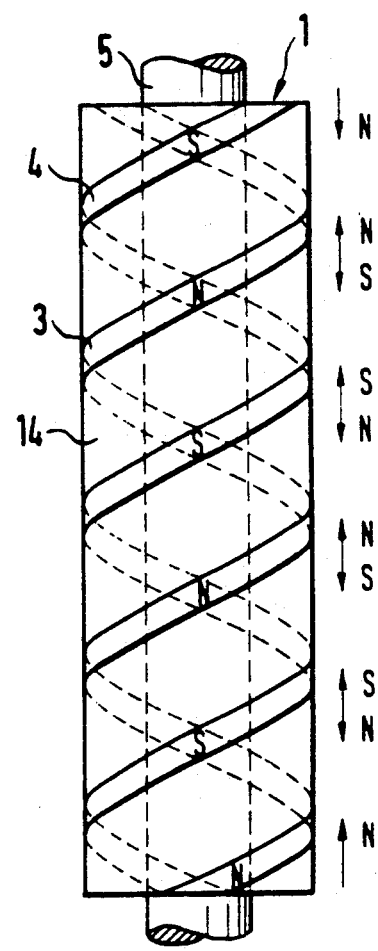
FIG. 8 a double helix in a further embodiment with soft magnetic helixes and interposed axially oriented magnets.

FIG. 8 shows a double helix, in which the helixes 3,4 are made from soft magnetic material and are wound around a non-magnetic core 5. Permanent magnets are arranged in axial orientation in the gaps between helixes 3,4 and as can in particular be gathered from FIG. 9. The permanent magnets 14 are inserted with alternating polarity, so that in each case a gap with north orientation alternates with a gap having south orientation. Thus, a helix is always flanked by identical magnetic poles, which simultaneously leads to the polarity of the helixes. This leads to a very high concentration of magnetic lines 7, which essentially have the configuration shown in broken line form in FIG. 9.

Figure 9:
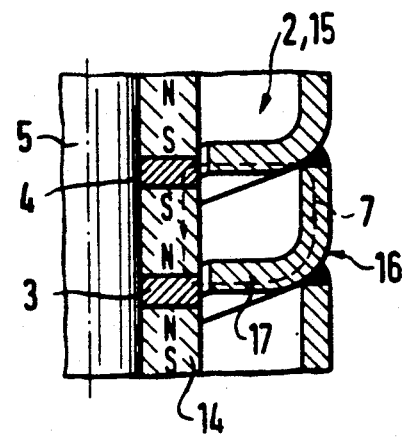
FIG. 9 a part section through a linear drive in another construction with a double helix according to FIG. 8 and formed from L-profile parts.
Figure 10:
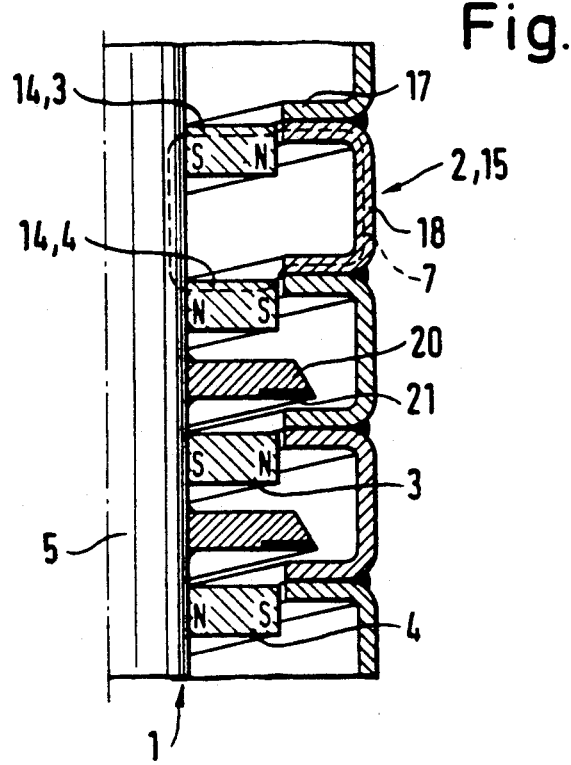
FIG. 10 a partial section through a linear drive in another embodiment with a double helix with radially oriented magnets, a ribbed profile tube part assembled from U-profile parts and a safety helix.

In the case of the embodiment shown in a relatively small detail in FIG. 9, the profile part 2 is constructed as a ribbed tube 15. The radially directed ribs 17 are in each case part of a L-profile 16, which is joined together to form an endless tube by welding. In the embodiment according to FIG. 10, the double helix is provided with radially oriented magnets 14, in the same way as in FIGS. 1, 2 and 6. Profile part 2 is formed in the same way as in the embodiment of FIG. 9, use being made of U-profiles, which are welded together in axial sequence with their legs resting on one another. The welded together legs in each case form a rib 17 of the thus produced profile part 2.

A safety helix 20 of non-magnetic steel is provided between the pole helixes 3, 4 of double helix 1 and can have one to two turns. Helix 20 projects relatively far and in radially projecting manner between the ribs 17 of profile part 2 or 15 and has on its braking area cooperating with ribs 17 a brake lining 21. Helix 20 is fixed to the substantially rod-like core 5 of soft magnetic material of the double helix 1, e.g. by welding.

Figure 11:
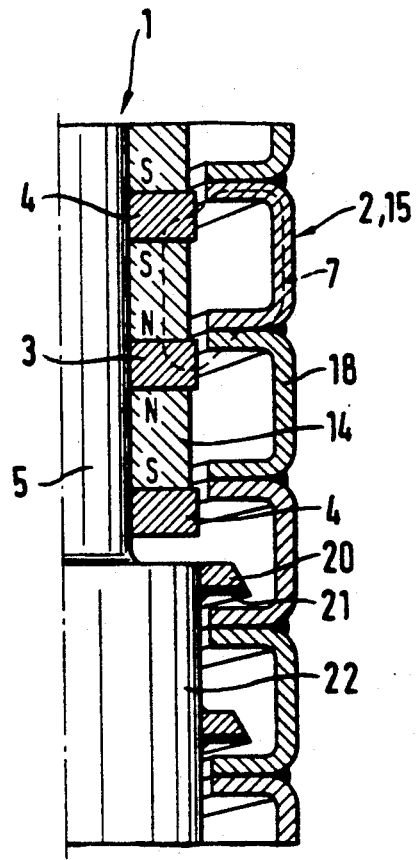
FIG. 11 a section as in FIG. 10, but with a tube part with axially aligned magnets.

Finally, FIG. 11 shows another embodiment, in which the double helix 1 is constructed in substantially the same way as in FIG. 8 and with axially oriented magnets 14. As in FIG. 10, the profile part 2, 15 is welded together from U-profiles. Once again a safety helix 20 is provided, but is arranged outside the core portion with the pole helixes 3, 4 of double helix 1. This can, e.g. be the rotor end. For this purpose core 5 is provided with a step 22, which has a larger diameter and the latter roughly corresponds to the diameter of the pole helixes 3, 4. The active braking area of the safety helix 20 is also provided with a brake lining 21 which, in this embodiment, substantially covers the entire active end face of the safety helix, whereas in the embodiment according to FIG. 10 the brake lining represents only part of the axially directed safety helix braking area. The safety helixes 20 are in each case so spaced with respect to the ribs 17 that even in the case of 90% of the maximum loading, the safety helixes 20 are engaged on ribs 17 and braking starts without the magnetic fields being broken or interrupted beforehand.

I claim:

1. Non-contacting linear drive, including
    at least one linearly oriented, tubular fixed guidance part of ferromagnetic material, the guidance part having an inner wall surface, ferromagnetic double helixes being provided on the inner wall surface, the guidance part being a profile part,
    at least one rotatable transportation part including a permanent magnet, the transportation part being movable along the guidance part and being arranged coaxially therewith,
    each helix of the guidance part corresponding to a pole of the magnet of the at least one transportation part,
    the improvement comprising
    the rotatable transportation part (1) also having double helixes (3, 4) of ferromagnetic material, the double helixes (3, 4) of the transportation part (1) being arranged around a core (5),
    a magnetic circuit being formed by the guidance part and the transportation part producing a constant magnetic field (7), and
    the permanent magnets (14) in the transportation part (1) being mounted in such a way that the two helixes (3, 4) of the transportation part (1) are oppositely polarized.

2. Linear drive according to claim 1, wherein the guidance part (2) has window-like recesses (6), helical webs (8) being located axially between the recesses (6) and having the same spacing as the helixes (3, 4) of the transportation part.

3. Linear drive according to claim 1, wherein the guidance part (2) has an undulatory profiling with hills (11) and valleys (12) succeeding one another in transportation direction and which have the same spacing as the helixes (3, 4) of the transportation part.

4. Linear drive according to claim 1, wherein the guidance part (2) has ribs (17) substantially at right angles to the double helixes (3, 4) of the transportation part, the ribs (17) having the same spacing as the helixes (3, 4) of the transportation part.

5. Linear drive according to claim 3, wherein the hills (11) have cut-off tips extruding substantially parallel to the outer cylindrical circumferential surface of the helixes (3, 4) of the transportation part and over substantially the same axial extension as the helixes (3, 4) of the transportation part.

6. Linear drive according to claim 1, wherein the double helixes (11, 17) of the profile parts (2) are inclined in substantially the same direction as the helixes (3, 4) of the transportation part.

7. Linear drive according to claim 4, wherein the ribs (17) of guidance part (2) each form one leg of L-profiles (16), each leg being connected to the successive other leg by welding.

8. Linear drive according to claim 4, wherein the ribs (17) of guidance part (2) are formed by flat-outside superimposed legs of two U-profiles (18) succeeding one another in the transportation direction and nondetachably interconnected.

9. Linear drive according to claim 7, wherein, when the guidance part (2) is constructed as a ribbed tube (15), the L-profile 16 is constructed by welding to form an endless tub with internal helix ribs (17).

10. Linear drive according to claim 1, wherein the magnets (14) are arranged in radial orientation in the helixes (3, 4) of the transportation part.

11. Linear drive according to claim 1, wherein the helixes (3, 4) of the transportation part are made from soft magnetic material, core (5) is made from non-magnetic material and the magnets (14) are arranged in a gap defined between the helixes (3, 4) of the transportation part in axial orientation.

12. Linear drive according to claim 1, wherein at least one safety helix (20) made from non-magnetic steel is arranged on the double helix transportation part which has a maximum of two turns and substantially extends over the entire extension of ribs (11,17) in the tube profile part (10,16,18) and cooperates with said ribs (11, 17) of the profile part (10, 16, 18).

13. Linear drive according to claim 12, wherein the safety helix (20) is arranged between the pole helixes (3,4) with radially oriented magnets (14) on core (5).

14. Linear drive according to claim 12, wherein in the case of axially oriented magnets the safety helix (20) is provided on a portion of core (5) located outside the magnetic helix zone (3,4).

15. Linear drive according to claim 8, wherein, when the guidance part (2) is constructed as a rib tube (15), the U-profile (18) is constructed by welding to form an endless tube with internal helix ribs (17).

* * * * *

UNITED STATES PATENT AND TRADEMARK OFFICE
CERTIFICATE OF CORRECTION

PATENT NO.   : 5,079,458
DATED        : January 7, 1992
INVENTOR(S)  : Peter Schuster It is certified that error appears in the above-identified patent and that said Letters Patent is hereby corrected as shown below:

On the title page, after item [58] insert the following:
[30]   Foreign Application Priority Data
       September 3, 1987[DE] Fed. Rep. of Germany...P 37 29 510.1

Signed and Sealed this

Twenty-fifth Day of May, 1993

Attest:

MICHAEL K. KIRK

*Attesting Officer*    *Acting Commissioner of Patents and Trademarks*